UNITED STATES PATENT OFFICE.

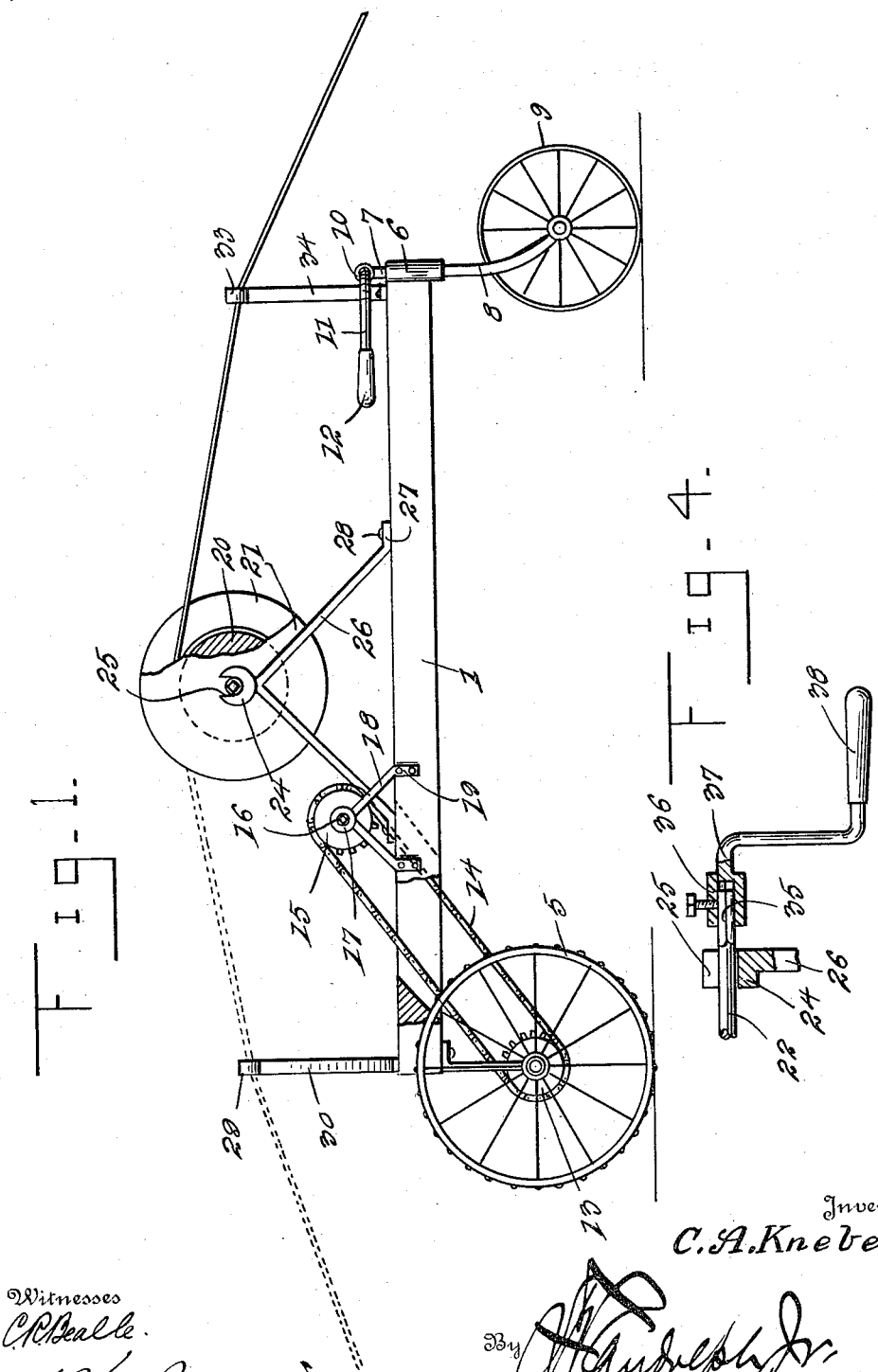

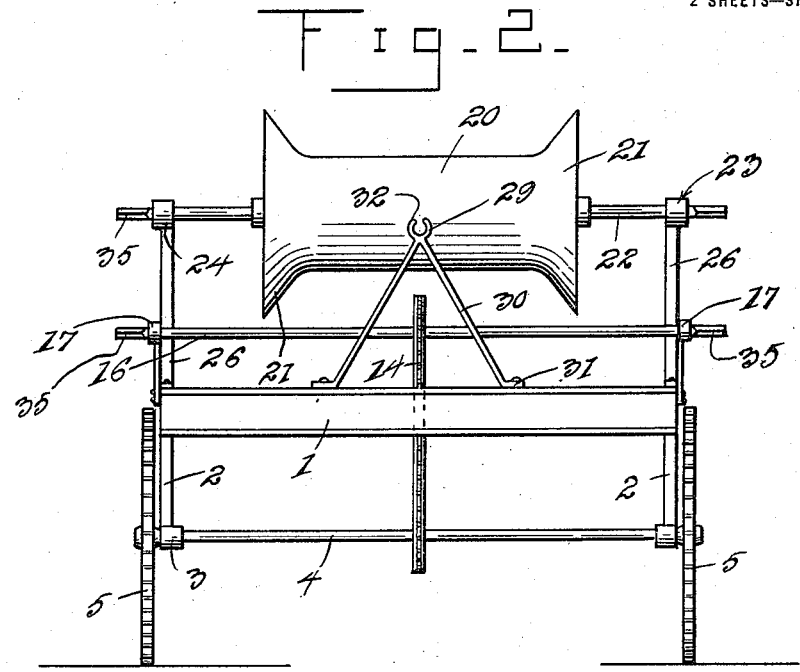
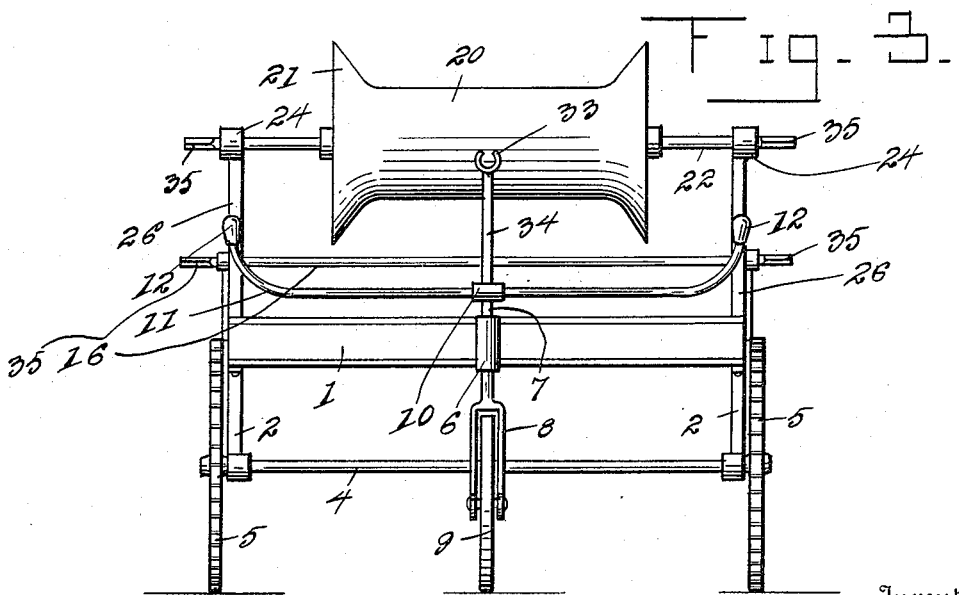

CHARLES A. KNEBEL, OF HILLS, IOWA.

WIRE-REEL.

1,175,774.  Specification of Letters Patent.  Patented Mar. 14, 1916.

Application filed September 8, 1913. Serial No. 788,656.

*To all whom it may concern:*

Be it known that I, CHARLES A. KNEBEL, a citizen of the United States, residing at Hills, in the county of Johnson and State of Iowa, have invented certain new and useful Improvements in Wire-Reels; and I do hereby declare the following to be a full, clear, and exact description of the invention, such as will enable others skilled in the art to which it appertains to make and use the same.

This invention relates to new and useful improvements in wire reels and has for its object the provision of a device upon which fence wire is adapted to be wound when it is desired to transport the same.

Another object of my invention is the provision of such a device which will permit the easy substitution of a spool of wire for another.

A still further object of my invention is the provision of such a device which will be cheap to manufacture, simple in construction and easy to operate.

With the above and other objects in view I will now proceed to describe my invention in the following specification and accompanying drawings, in which, Figure 1 is a side view of my improved wire reel showing a portion of the frame partly broken away to more clearly illustrate the method of applying power to the front wheels, Fig. 2 is a front view of the improved wire reel, Fig. 3 is a rear view of the improved wire reel, and Fig. 4 is a detail sectional view of a fragment of the reel carrying shaft and bearing therefor showing the operating crank in position thereon.

Referring to the drawings by characters of reference 1 indicates the framework of my improved wire reel having secured to the forward end thereof suitable downwardly extending supports 2, at the lower end of which are formed the sleeves 3, which are adapted to form bearings for the axle 4, upon which the wheel 5 is adapted to be secured. The opposite end of said frame 1 is provided with a suitable centrally located sleeve 6 through which the bar 7 terminating at its lower extremity in the forked member 8, is rotatably mounted. A suitable wheel 9 is rotatably mounted between the arms of the forked member as will be clearly seen upon referring to Fig. 3. The upper end of the bar 7 preferably terminates in the sleeve 10 through which the bignt portion of the U-shaped member 11, forming the handle bars is adapted to extend. This member 11 is provided at each end with suitable grips 12 which are adapted to form handles by means of which the bar 7, carrying the forks 8, may be rotated, thus providing a means whereby the devices may be steered.

Intermediate the ends of the axle 4 and rigidly secured thereto I preferably provide the sprocket wheel 13 over which a suitable chain 14 is adapted to pass. This chain 14 coöperates with a sprocket 15 which is secured to a suitable shaft 16 which in turn is driven by said sprocket. The ends of this shaft 16 are journaled in the bearings 17 which are formed integrally with the arms 18 having formed at the lower ends thereof the angular extensions 19 by means of which the said bearings are held rigidly with relation to the frame 1.

A suitable drum 20 having formed at the ends thereof the flanges 21 is keyed or otherwise secured to the shaft 22, which is rotatably mounted in the bearings 23. These bearings preferably comprise the cylindrical portions 24 having formed therein suitable recesses 25. Formed integrally with the cylindrical portions at points diametrically opposite the recesses and extending downwardly and outwardly therefrom I preferably provide the arms 26 having formed at their lower extremities the angular extensions 27 through which the bolts 28 are adapted to pass. These bolts 28 are adapted to enter the frame 1 and firmly secure the arms 26 in position thereon.

A suitable guide 29, having formed integrally therewith the downwardly extending arms 30, which terminate in the angular extensions 31, is secured to the end of the frame intermediate its width. This guide is preferably provided with a slot 32 by means of which the wire when it is being reeled may be permitted to enter the guide. A similar guide 33 is secured to the opposite end of the frame in direct alinement with the first mentioned guide and has formed integrally therewith the downwardly extending arm 34 which is secured to the frame by any suitable means.

The ends of each of the shafts 16 and 22 terminate in the squared portions 35, which are adapted to receive the sockets 36 formed integrally with the cranks 37. These cranks are preferably provided with a suitable handle 38 by means of which they are adapted to be rotated.

It will be clearly seen from the foregoing that when it is desired to make use of this improved reel the end of the wire is secured to the drum in any suitable manner and is adapted to be wound thereon. It will be apparent that upon the revolution of the crank which is secured to the drum the wire may be wound or unwound as the case may be and when it is desired to move the device the operator removes the crank from its position on the shaft 22 and places the same on the end of the shaft 16, whereupon by rotating the crank it will be apparent that the carriage may be moved to the desired point. Owing to the position of the guides 29 and 33 it will be apparent that the wire may be wound or unwound from the drum and during the winding process will be held smoothly thereon, whereas during the unwinding process the wire will be fed from the reel at the point where the user may so desire.

While in the foregoing I have shown and described the preferred embodiment of my invention I wish it to be understood that I may change the specific arrangement and combination of parts without in any way departing from the spirit and scope of the invention as defined in the appended claim.

What is claimed is:—

A wire reel carriage comprising a rectangular frame, a sleeve centrally of the forward end of the frame, said sleeve being disposed in a vertical plane, a fork rotatable in the sleeve, a wheel rotatably mounted in the fork, a pair of handle bars secured to the fork and of a width sufficient to extend entirely across the frame to enable the operator to walk beside the frame and control the direction of its movement, a pair of drive wheels at the rear of the frame, a sprocket arranged to drive said drive wheels, a chain running over said sprocket and arranged to drive the same, brackets supported on the frame, a shaft rotatable in the brackets, a sprocket mounted on the shaft and coöperating with the same to transmit motion to the chain and thence to the rear wheel and an interchangeable crank adapted to be secured to either end of the shaft to enable the operator to drive the device from either side.

In testimony whereof I affix my signature in presence of two witnesses.

CHARLES A. KNEBEL.

Witnesses:
FRANK W. HORN,
M. F. SIMITZ.

Copies of this patent may be obtained for five cents each, by addressing the "Commissioner of Patents, Washington, D. C."